(12) United States Patent
Whitehead et al.

(10) Patent No.: US 6,325,518 B1
(45) Date of Patent: Dec. 4, 2001

(54) EXTENDABLE EXTERIOR REARVIEW MIRROR ASSEMBLY

(75) Inventors: Peter John Whitehead, Holland; Michiel Pieter van de Ven, West Olive, both of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/267,532

(22) Filed: Mar. 12, 1999

(51) Int. Cl.[7] .................................. G02B 5/08; G02B 7/18
(52) U.S. Cl. ........................ 359/841; 359/873; 248/478; 248/549; 248/900
(58) Field of Search ........................... 359/841, 872, 359/873, 881; 248/477, 478, 480, 549, 900

(56) References Cited

U.S. PATENT DOCUMENTS

| | | |
|---|---|---|
| D. 285,549 | 9/1986 | Haack ........................ D12/187 |
| D. 331,216 | 11/1992 | McGouldrick ................ D12/187 |
| 3,118,965 | 1/1964 | Jones . |
| 3,119,591 | 1/1964 | Malecki ........................ 248/282 |
| 3,420,490 | 1/1969 | Malachowski ................ 248/486 |
| 4,135,694 | 1/1979 | Stengenga et al. ............ 218/478 |
| 4,315,614 | 2/1982 | Stegenga et al. .............. 248/479 |
| 4,558,930 * | 12/1985 | Deedreek ...................... 359/841 |
| 4,730,913 | 3/1988 | Boothe . |
| 4,740,066 | 4/1988 | Whitehead . |
| 4,789,232 | 12/1988 | Urbanek . |
| 4,793,582 | 12/1988 | Bronstein et al. ............. 248/486 |
| 4,815,836 | 3/1989 | Byers et al. . |
| 4,907,871 | 3/1990 | Hou . |
| 4,911,545 | 3/1990 | Miller . |
| 4,921,337 | 5/1990 | Hou . |
| 4,936,670 * | 6/1990 | Yoo ............................... 359/841 |
| 4,998,812 | 3/1991 | Hou . |
| 5,007,724 * | 4/1991 | Hou ............................... 359/841 |
| 5,028,029 | 7/1991 | Beck et al. .................... 248/479 |
| 5,061,056 | 10/1991 | You .............................. 259/872 |
| 5,096,283 | 3/1992 | Croteau ......................... 359/865 |
| 5,217,197 | 6/1993 | Spitzer ........................... 248/479 |
| 5,292,100 | 3/1994 | Byers et al. .................... 248/480 |
| 5,432,640 | 7/1995 | Gilbert et al. ................. 359/841 |
| 5,483,385 | 1/1996 | Boddy ........................... 359/841 |
| 5,489,080 | 2/1996 | Allen ............................. 248/480 |
| 5,513,048 | 4/1996 | Chen ............................. 359/881 |
| 5,546,239 | 8/1996 | Lewis ............................ 359/855 |
| 5,572,376 * | 11/1996 | Pace .............................. 359/877 |
| 5,623,374 | 4/1997 | Montanbault ................. 359/841 |
| 5,760,977 | 6/1998 | Leder et al. ................... 359/841 |
| 5,886,838 * | 3/1999 | Kuramoto ..................... 359/841 |

FOREIGN PATENT DOCUMENTS 2013178    9/1990  (CA) .

* cited by examiner

*Primary Examiner*—Darren Schuberg
*Assistant Examiner*—Mark A. Robinson
(74) *Attorney, Agent, or Firm*—Van Dyke, Gardner, Linn & Burkhart, LLP (57) ABSTRACT

An extendable exterior rearview mirror assembly includes a mirror subassembly, a bracket which is adapted for mounting to a vehicle, and a support which mounts the mirror subassembly to the bracket. Support extends into the housing which is movable along the support. The housing includes a retracted position and at lease one outboard position, which define a direction of extension. The mirror assembly further includes a drive assembly which is supported in the housing and drivingly coupled to the support. The drive assembly selectively moves the housing along the support. The mirror assembly further includes a clutch mechanism which drivingly decouples the drive assembly from the support when a force of sufficient magnitude is applied to the housing in the direction of extension such that the housing can be manually moved along the support.

17 Claims, 10 Drawing Sheets

EXTENDABLE EXTERIOR REARVIEW MIRROR ASSEMBLY

The present invention relates to an extendable exterior rearview mirror assembly for mounting on a vehicle and, more particularly, to an exterior rearview mirror for mounting on a vehicle which can be selectively extended by the occupant of the vehicle to increase the field of view for example when the vehicle is used for towing a trailer, camper, another vehicle, or the like.

Conventional towing mirrors include a reflective element housed in a frame that is mounted to the body of a vehicle by a support and mounting bracket. The support extends the mirror a greater distance from the body of the vehicle than conventional exterior rearview mirrors in order to provide an unobstructed view to the rear of the towed object. For example, in U.S. Pat. No. 3,119,591 to A. J. Malecki an extendable rearview mirror assembly is disclosed which includes a rigid support for eccentrically mounting the mirror assembly in a fixed extended position from the vehicle. However, these fixed extended rearview mirror assemblies increase the width of the vehicle—in some vehicles, the width is increased beyond the maximum width allowed by conventional vehicle transport trucks which deliver the vehicles to the dealership. Therefore, these extended mirror assemblies are typically installed at the dealership which ultimately increases the cost of the vehicle.

In addition, the fixed extended rearview mirror assemblies is of limited use for a driver who only occasionally tows a trailer. Since such mirror assemblies substantially increase the width of the vehicle, they hamper normal maneuvering through passages such as those defined by garage door openings, drive-through banking structures, and the like. Furthermore, they are more vulnerable to being damaged or to causing damage than conventional exterior rearview mirrors, especially when used by an inexperienced driver. This inconvenience is compounded by the fact that not only do these extended rearview mirrors generally detract from the appearance of the vehicle, they increase the cost of the vehicle.

In response to the needs of drivers who only occasionally tow objects, several extendable mirror assemblies have been developed. For example, in U.S. Pat. Nos. 5,513,048 and 5,489,080 extendable mirrors are disclosed which includes telescoping tubular members which are fixed in position by threaded fasteners. Though simple in construction, these telescoping members typically require the operator to use a tool to adjust the position of the mirror. Moreover, they tend to increase the vibration of the mirror assembly, which may in turn loosen the connection between the telescoping members of the mirror assembly especially when the mirror assembly is in the outboard position.

In U.S. Pat. No. 5,546,239 to Lewis, an extendable mirror element is disclosed in which the mirror element is extended from the mirror casing to an outboard position. Again the mounting bracketry lacks the structure to perform well in vibration. Consequently, the mirror element is more vulnerable to damage.

More recently, manually extendable rearview mirror assemblies have included one or more mounting arms which releasably engage the housing of the mirror subassembly to permit manual extension of the mirror subassembly along the mounting arms, such as disclosed in pending U.S. patent application Ser. No. 08/838,877 filed Apr. 19, 1997 by Peter J. Whitehead, now U.S. Pat. No. 5,969,890, which is assigned to Donnelly Corporation of Holland, Mich., which is herein incorporated by reference in its entirety. Other more recent extendable mirrors include one or more mounting arms which frictionally engage the mirror subassembly housing to permit selective manual adjustment of the position of the housing along the mounting arm, such as disclosed in pending U.S. patent application Ser. No. 08/821,458 filed Mar. 21, 1997, to Steven G. Hoek, now U.S. Pat. No. 5,903,402, which is assigned to Donnelly Corporation of Holland, Mich. and which is herein incorporated by reference in its entirety.

In contrast, U.S. Pat. No. 5,572,376 to Pace discloses an electrically actuated extendable vehicle mirror which includes a rack and pinion system and a drive motor to translate the mirror longitudinally along the mirror support arm. Despite the enhanced control of the position of the mirror, the Pace assembly does not include any safety features that prevent the mirror from being damaged when it inadvertently overextended or provide a manual override option which are both highly desirable. In addition, the Pace drive assembly is relatively complicated and the associated parts increase the weight of the mirror assembly significantly. With an increased number of parts, the cost of manufacture increases. Further, weight increases of this magnitude tend to increase the vibration of the mirror assembly and degrade the performance of the mirror.

Consequently, there is a need for an extendable exterior rearview mirror that can be installed at the factory, which provides extended field of view required when towing vehicles and yet be retracted to a normal operating position where it does not hamper the maneuverability of the vehicle. Moreover, the extendable rearview mirror should have minimal impact on the vibration of the mirror assembly and be relatively easy to adjust between non-towing and towing positions by the occupant of the vehicle without the need for tools and yet provides a safety mechanism and manual override option.

SUMMARY OF THE INVENTION

Accordingly, the present invention provides an improved extendable exterior rearview mirror assembly, especially suited for towing vehicles, which is selectively adjustable between a retracted position for normal non-towing use and one or more extended positions in which the mirror assembly is outboard of its normal position allowing an increased field of view to the rear of a towed trailer or the like. These functions are provided by a drive assembly which allows the occupant of the vehicle to selectively adjust the position of the mirror housing and a clutch mechanism which provides a safety release for the drive assembly and, further, allows manual adjustment of the mirror housing.

According to one aspect of the invention, an extendable exterior rearview mirror assembly includes a mounting bracket adapted for mounting to a vehicle, a support supported by the mounting bracket, a mirror subassembly having a housing and a reflective element supported by the housing and being movably mounted on the support, and a drive assembly supported in the housing. The drive assembly selectively engages the support to move the housing with respect to the support to adjust the position of the mirror subassembly. The extendable exterior rearview mirror further includes a clutch for decoupling the driver from engagement with the support which provides a safety mechanism and a manual override option. In one form, the mirror subassembly is selectively moved along the support between inboard and outboard positions by the drive assembly.

In another form, the support comprises a pair of support arms, with the support arms extending into the housing of the mirror subassembly. The support arms are interconnected by a member with the member being coupled to the drive assembly. In one form, the member is releasably coupled to the drive assembly.

According to another form, the drive assembly includes a motor, a drive pulley, an idler pulley, and a belt which extends around the drive pulley and the idler pulley. The belt is coupled to the support such that when the motor drives the drive pulley, the housing moves along the support. The support may comprise a pair of arms, with the support arms being interconnected by a member and with the member being coupled to the belt.

In yet another form, the drive assembly includes a motor and a plurality of rollers. The motor drives the rollers to frictionally engage the support to move the housing along the support. For example, the driver may include a drive rod, with the rollers being mounted on the drive rod with both the drive rod and the rollers extending into the support. The support may comprise a tubular member, with the rollers engaging the inner surface of the tubular member to thereby move the housing along the support.

According to yet another form of the invention, the drive assembly includes a lead screw and a motor. The lead screw extends through a portion of the support and is driven by the motor to move the housing on the support. Preferably the support includes a pair of support arms, with the support arms being interconnected by a member. The lead screw extends through the member. Optionally, the member includes flexible thread engaging portions for engaging the lead screw whereby the flexible thread engaging portions disengage from the lead screw when a force is applied to the housing in the direction of the extension thus permitting manual adjustment of the housing along the support.

In another form, the support includes a tooth rack. The drive assembly includes a motor and at least one movable piston which is driven by the motor to drivingly engage the tooth rack to selectively move the housing along the support. In one form, the piston is mounted on a shaft, which is driven by the motor. The shaft imparts motion to the piston and moves the piston in a cycloidal path to drivingly engage the tooth rack. Optionally, the drive assembly may include a plurality of piston members and a corresponding plurality of drivers, with the drivers selectively and sequentially moving the pistons into engagement with the tooth rack to move the housing along the support. For example, the drivers may comprise solenoids.

According to another aspect of the invention, an extendable exterior rearview mirror assembly includes a mirror subassembly having a housing and a reflective element, a bracket which is adapted for mounting to a vehicle, a support which is mounted to the bracket, and a link which pivotally mounts the mirror subassembly to a the support. The mirror assembly further includes a drive assembly supporting the housing which is drivingly coupled to the support and moves the housing between a retracted position and at least one extended position which define a direction of extension. The drive assembly includes a clutch for decoupling the drive assembly from the support when a force is applied to the housing in the direction of extension to provide manual adjustment of the position of the housing.

As will be understood, the extendable exterior rearview mirror assembly of the present invention provides numerous advantages over the prior known mirror assemblies. The extendable exterior rearview mirror assembly provides an extended field of view for towing vehicles and yet can be retracted to a normal operating position by the occupant of the vehicle to return the vehicle to its normal width. Therefore, the extendable exterior rearview mirror assembly of the present invention can be installed at the factory. Moreover, the extendable mirror subassembly of the exterior rearview mirror assembly includes a safety release so that the mirror subassembly can be manually adjusted and, further, the drive assembly is protected from damage if the mirror assembly is inadvertently overextended.

These and other objects, advantages, purposes and features of the invention will become more apparent from the study of the following description taken in conjunction with the drawings.

DESCRIPTION OF THE PREFERRED EMBODIMENTS

Figure 1:
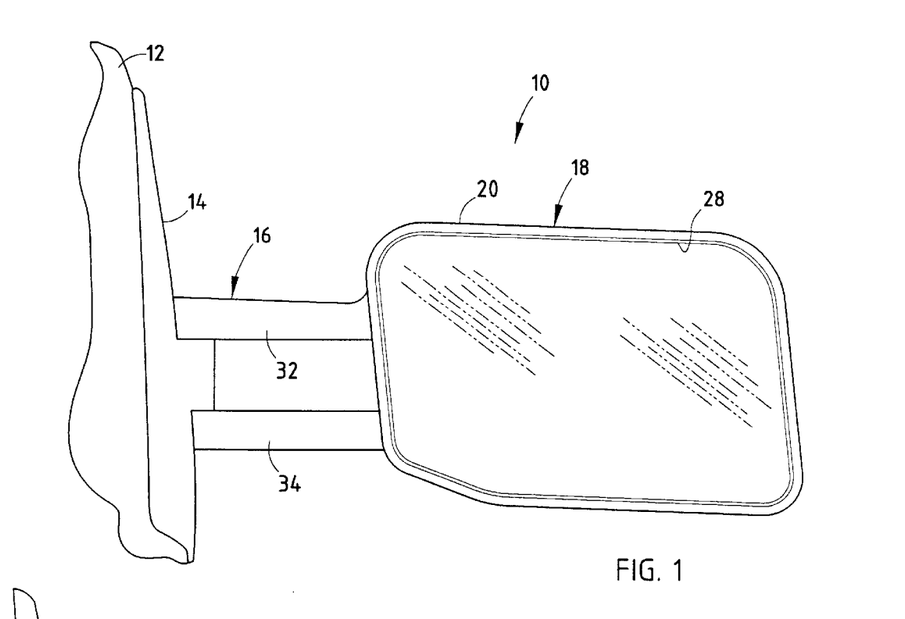
FIG. 1 is an elevation view of an extendable exterior rearview mirror assembly of the present invention installed on a vehicle.

Referring to FIG. 1, an extendable exterior rearview mirror assembly 10 of the present invention is shown mounted to a vehicle 12. Rearview mirror assembly 10 includes a mounting bracket 14, a housing support 16 mounted to bracket 14, and a mirror subassembly 18. Mounting bracket 14 is preferably mounted to vehicle 12 by conventional methods, such as by fastening with a pair of threaded studs which pass through the vehicle and are secured thereto with nuts. Support 16 may comprise a fixed support, a break-away support, or a folding support. In the illustrated embodiment, support 16 comprises a break-away support.

Figure 2:
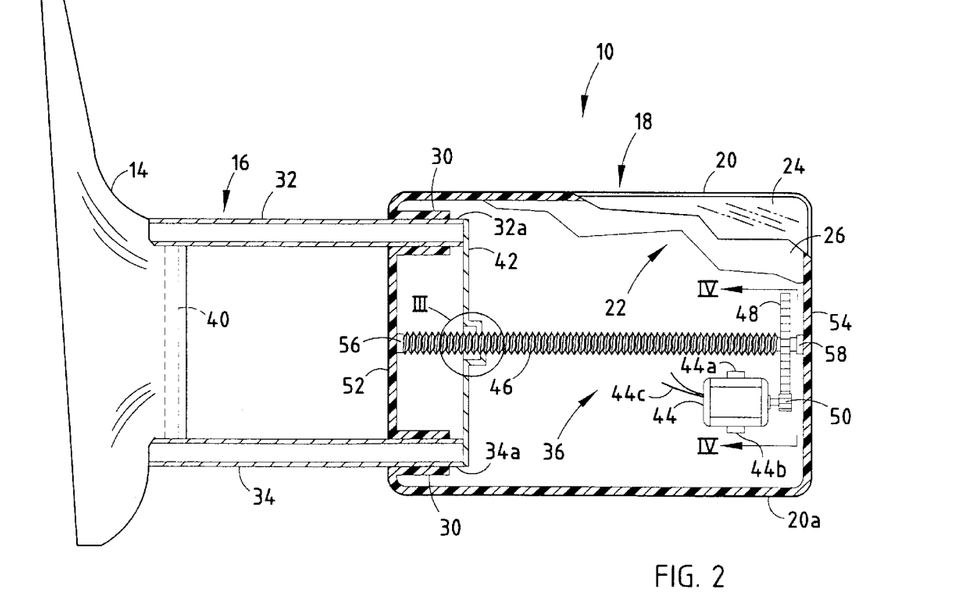
FIG. 2 is a partial fragmentary view of the extendable exterior rearview mirror assembly of FIG. 1.
Figure 3:
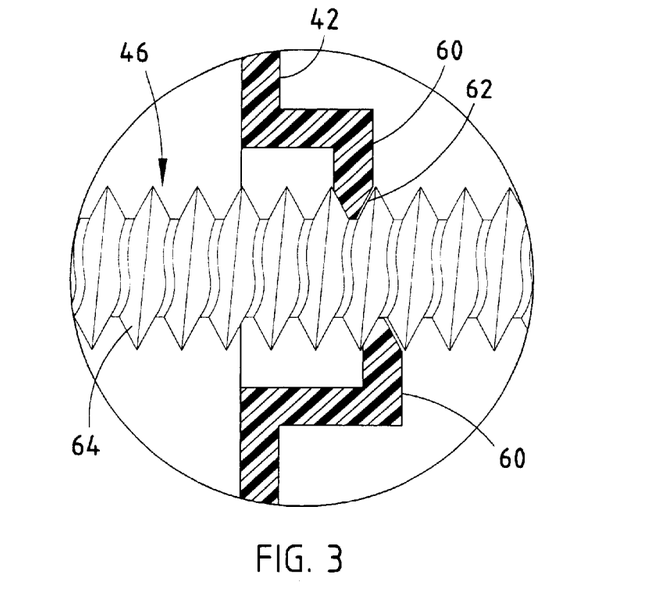
FIG. 3 is an enlarged view of a clutch assembly of the exterior rearview mirror assembly of FIG. 2.

As best seen in FIG. 2, mirror subassembly 18 includes a mirror case or housing 20 and reflective element assembly 22, which is supported in mirror housing 20. Reflective element assembly 22 includes a reflective mirror element 24 and a backing plate 26, which supports reflective mirror element 24 in housing 20. Reflective mirror element 24 may comprise conventional nonelectro optic planar or convex mirror element including a metallic reflector coated glass substrate, such as with a thin chromium or chromium alloy reflector coating, or a non-metallic reflector layer, such as a dichroic layer as described in U.S. Pat. No. 5,207,492 to Robert et al. or a reflector comprising a silicon reflective layer such as described in U.S. Pat. No. 5,535,056 to Caskey et al., which are herein incorporated by reference in their entireties. Alternatively, reflective element 24 may comprise a variable reflective electro optic element, such as electrochromic mirror element comprising one of several types of electrochromic elements, for example an element of the electrochemichromic type, which is disclosed in U.S. Pat. No. 5,140,455 issued to Varaprasad et al., or may be of the solid state type such as disclosed in U.S. Pat. No. 4,712,879 issued to Niall R. Lynam et al., U.S. patent application No. 08/023,675, filed Feb. 22, 1993, by Varaprasad et al., U.S. patent application Ser. No. 08/913,557, filed Feb. 8, 1994, by Varaprasad et al., and U.S. patent application Ser. No. 08/238,521, filed Mar. 5, 1994, by Varaprasad et al., all commonly assigned with the present application to Donnelly Corporation of Holland, Mich., the disclosures of which are herein incorporated by reference in their entireties. Such electrochromic elements comprise an electrically responsive electrochromic medium that modulates reflectivity from a reflective element. Such electrochromic mirror elements are continuously variable and exhibit multiple reflectant states as the voltage applied thereto is varied. Alternately, reflective element 16 may comprise other electro optic mirror elements such as a liquid crystal mirror and the like. Where reflective element 16 comprises an electrochromic mirror element, the electrochromic mirror element is preferably driven by signals produced by a variable reflectant system of the type disclosed in U.S. patent application Ser. No. 08/316,047 for a "Modular Variable Reflectant Mirror Assembly", filed Sep. 30, 1994, by Kenneth L. Shierbeek et al., which is herein incorporated by reference in its entirety. In addition, mirror subassembly 18 may include a manual or electric actuator to move the reflective element, rain sensors, blind spot detection systems, compass systems, intrusion detection systems, vehicle security lights, turn signal indicators, keyless entry systems, and trainable garage door opener systems, and the like. For details of several other vehicle systems which can be incorporated into subassembly 18, reference is made herein to pending U.S. patent application entitled "Modular Rearview Mirror Assembly Including an Electronic Control Module", Ser. No. 08/702,228 which was filed on Aug. 23, 1996, by Niall Lynam et al. and which is assigned to Donnelly Corporation of Holland, Mich., the disclosure of which is incorporated by reference herein in its entirety.

Housing 20 is preferably a modular housing and injection molded from non-electrically conductive material, such as suitable thermoplastic resin. Housing 20 includes a rearward facing opening 28, in which reflective element assembly 22 is positioned, and one or more sleeves 30 for receiving housing support 16. In the illustrated embodiment, housing support 16 includes a pair of support arms 32 and 34, which extend into respective sleeves 30 of housing 20 for supporting housing 20 thereon. Support arms 32 and 34 may comprise tubular members and are, preferably, injection molded from non-electrically conductive material, similar to housing 20. Housing 20 moves in and out on support arms 32 and 34 to permit the extension of mirror subassembly 18 from vehicle 12 between an inboard position and one or more outboard positions. The outboard positions provide larger fields of view which is suitable for viewing rearward towed objects, such as campers, trailers, or the like. The position of housing 20 is selectively controlled by a drive assembly 36, as will be discussed in more detail below.

As best seen in FIG. 2, support arms 32 and 34 are optionally pivotally mounted to mounting bracket 14 on a pivot bushing 40 and are adapted for limited pivotal movement about bushing 40 between a normal operating position and a break-away position, such break-away mountings are well known in the vehicle mirror assembly art.

Figure 4:
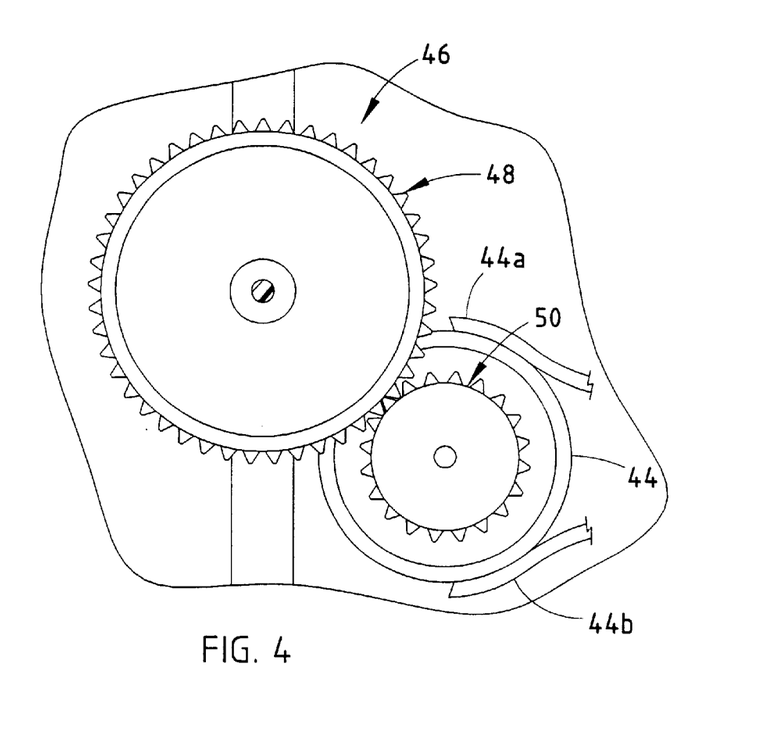
FIG. 4 is a side elevation view taken along lines IV—IV of FIG. 2.

As noted above, support arms 32 and 34 extend into housing 20 through sleeves 30 and, further, are interconnected at their free ends 32a and 34a by a plate member 42. Drive assembly 36 includes a motor 44 and a drive or lead screw 46, which includes a reduction gear 48 that is driven by a drive gear 50 of motor 44 (FIG. 4). Motor 44 is preferably powered by the vehicle battery and is electrically coupled to the vehicle electrical system through electrical leads 44c, which may be bundled along with other wiring in a harness, preferably an extendable harness, such as a spring mounted or coiled harness. It should be understood, further, that electrical leads 44c may be electrically coupled to an electronic module or the like housed in mirror subassembly 18, support 16, or bracket 14. Further, motor 44 is preferably actuated by a remote switch or toggle which is mounted in the vehicle cabin and, more preferably, in the vehicle cabin in close proximity to the driver. In addition, the switch or toggle preferably includes selection between the left and right mirror assemblies so that each mirror assembly can be individually controlled to extend or contract. Drive screw 46 extends through housing 20 and is optionally supported on opposed side walls 52 and 54 for example by bushings 56 and 58. Motor 44 is supported by motor supports 44a and 44b, which are in turn supported by housing wall 20a. Optionally, motor supports 44a and 44b may be formed as an integral part of housing 20 during molding. In a similar manner, bushings 56 and 58 may be directly adhered to housing wall 20a or optionally may be mounted in bushing supports which are either adhered to or molded along with housing 20. Drive screw 46 extends through plate member 42 to selectively couple drive assembly 36 to support 16. Plate member 42 includes flexible tongues or fingers 60 with tapered distal ends 62 which form threads for engaging threads 64 of drive screw 46. In this manner, when motor 44 drives drive screw 46, housing 20 is translated along support arms 32 and 34. Furthermore, flexible fingers 60 are sufficiently flexible to permit disengagement of tapered portion 62 from threads 64 of drive screw 46 when a force is applied to housing 20 in the direction of extension. In this manner, flexible fingers 60 form a clutch and permit manual override of drive assembly 36. In addition, flexible fingers 60 provide a safety override, for example when housing 20 is driven to extend into a rigid or fixed object, tapered portion 62 will disengage from threads 64 to drivingly decouple drive assembly 36 from support 16.

It should be noted that drive assembly 36 may include a bi-state or may be preprogrammed to index mirror subassembly 18 between desired positions along support 16. Alternately, drive assembly 24 may provide continuous movement driving the mirror subassembly between an infinite number of positions along support 16 between its fully retracted and its fully extended positions. In addition, drive assembly 24 may be coupled to a lock-out device or mechanism which prevents inadvertent or intended actuation of the extension of mirror subassembly 18 while the vehicle is driven down the highway. Such lockout device may be provided by a circuitry which detects: when the vehicle is placed in gear; or motion or speed of the vehicle. The circuitry may also be electrically coupled to and detect the operation of the ignition system. In such circumstances, the selection and setting of the position of the exterior mirror subassembly needs to be achieved in the non-operating mode.

Figure 5:
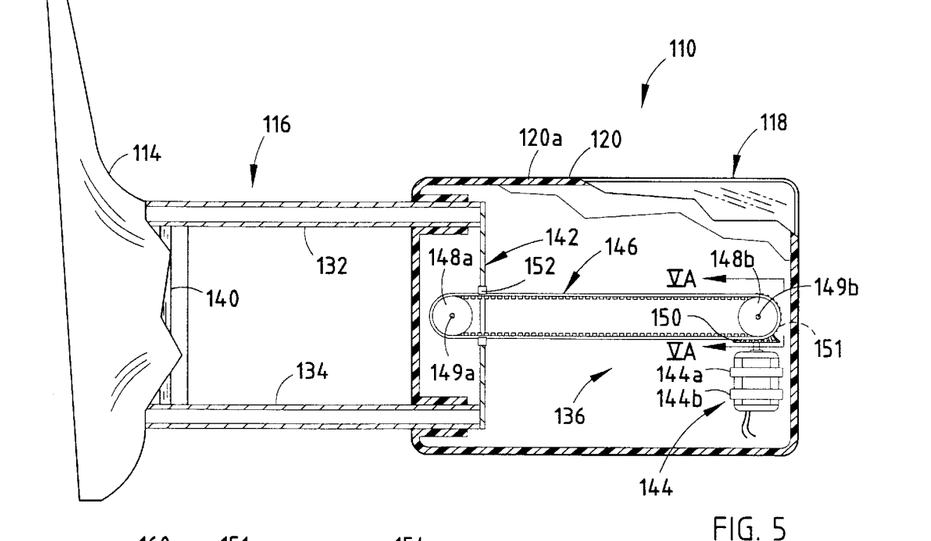
FIG. 5 is a partial fragmentary view of the extendable exterior rearview mirror assembly of FIG. 1 illustrating a second embodiment of the drive assembly.
Figure 5A:
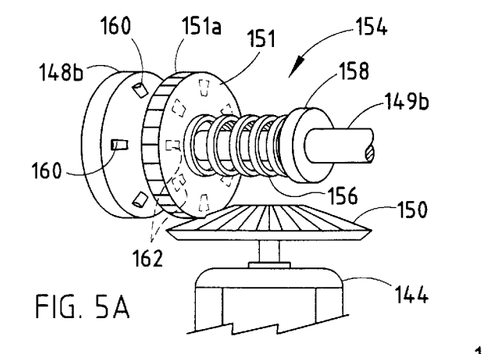
FIG. 5A is an enlarged view taken along line VA—VA of FIG. 5 of a clutch mechanism of the rearview mirror assembly of FIG. 2.

Referring to FIG. 5, a second embodiment 110 of an extendable mirror assembly is illustrated. Mirror assembly 110 includes a mounting bracket 114, a support 116, which is pivotally mounted on bracket 114 by a bushing 140, and a mirror subassembly 118 which is movably mounted on support 116. Similar to the previous embodiment, support 116 includes a pair of support arms 132 and 134 which extend into housing 120 through housing wall 120a. Housed in housing 120 is a drive assembly 136. Drive assembly 136 includes a motor 144 and a drive belt 146. Belt 146 is preferably a closed loop belt and extends around a pair of pulleys 148a and 148b which are respectively rotatably mounted on axles 149a and 149b in housing 120. As best seen in FIG. 5A, motor 144 includes a drive gear 150, such as a bevel drive gear, which drivingly engages a corresponding gear 151 that is drivingly coupled to pulley 148b. It should be understood, however, that other drive gears, for example a worm gear or the like, may be used to drive pulley 148b or drive belt 146. Similar to the previous embodiment, motor 144 is supported by motor supports 144a and 144b which are respectively adhered to or formed with housing wall 120a of housing 120.

Similar to the first embodiment, support arms 132 and 134 are interconnected by a plate member 142 to which closed drive belt 146 is coupled by a belt clamp 152. In this manner, as drive belt 146 is driven around pulleys 148a and 148b, housing 120 is translated or moved along support arms 132 and 134 to its desired position.

Referring again to FIG. 5A, drive assembly 136 further includes a clutch mechanism 154. Clutch mechanism 154 is formed by axle 149b, pulley 148b, and bevel gear 151 and a spring 156 which is mounted on axle 149b between a spring stop 158 and gear 151. Spring 156 urges gear 151 into frictional engagement with pulley 149b in order to drivingly couple drive assembly 136 with pulley 148b and, in turn, support 164. Furthermore, pulley 148b preferably includes a plurality of detents or ribs 160 which engage corresponding recesses 162 formed on pulley facing side 151a of gear 151. Therefore, as spring 156 pushes pulley 148b and gear 151 together, detents 160 will align and engage with recesses 162 to mechanically couple gear 151 and pulley 149b together. However, when a sufficient force is applied to housing 120, in the direction of extension detents 160 disengage from recesses 162, spring 156 compresses, and gear 151 is decoupled from pulley 149b to provide a clutch mechanism to permit manual override of drive assembly 136 and, further, provide a safety release of driver 136 from support 116.

Figure 5B:
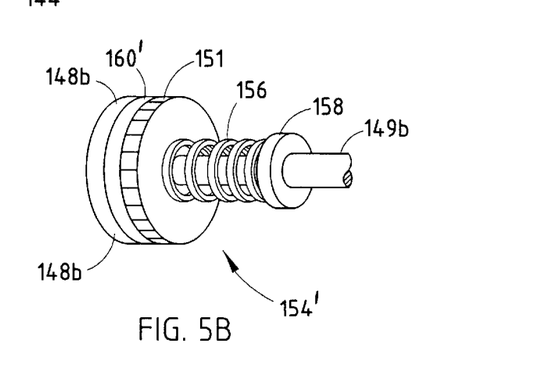
FIG. 5B is a similar view to FIG. 5A of a second embodiment of a clutch assembly of the present invention.

Alternately, as seen in FIG. 5B, clutch mechanism 154' may include a friction member 160' which is positioned between gear 151 and pulley 148b. In this manner, when spring 156 urges gear 151 toward pulley 148b, friction member 161 creates a sufficient force to drivingly couple gear 151 to pulley 148b. However, when a sufficient force is applied to housing 120 in the direction of extension, spring 156 compresses and the friction between friction member 161 go and gear 151 and pulley 148b is no longer sufficient to drivingly couple gear 151 and pulley 148b together, thus decoupling drive assembly 136 from arm 116. Preferably, springs 156 of clutch assemblies 154 and 154' are sized such that when gear 151 is stopped and pulley 149b is moved as a result of a force applied to housing 120, 148b pulley and gear 151 will disengage or decouple from each other to permit the manual adjustment of the position of housing 120. Likewise, if gear 151 is driven and housing 120 contacts a rigid or fixed member, springs 156 of clutch assemblies 154 and 154' are sized to permit pulley 148b to decouple from gear 151 to thereby decouple drive assembly 136 from support 116. As will be understood by those skilled in the art, an increase spring stiffness for spring 156 will increase the amount of force required to decouple drive assembly 136 from support 116.

Figure 6:
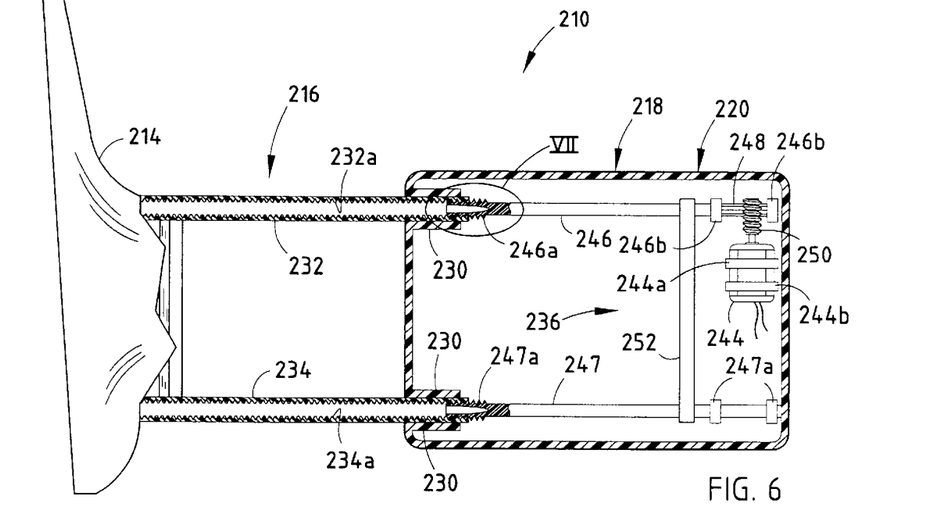
FIG. 6 is a partial fragmentary view of a third embodiment of an extendable exterior rearview mirror assembly of the present invention.
Figure 7:
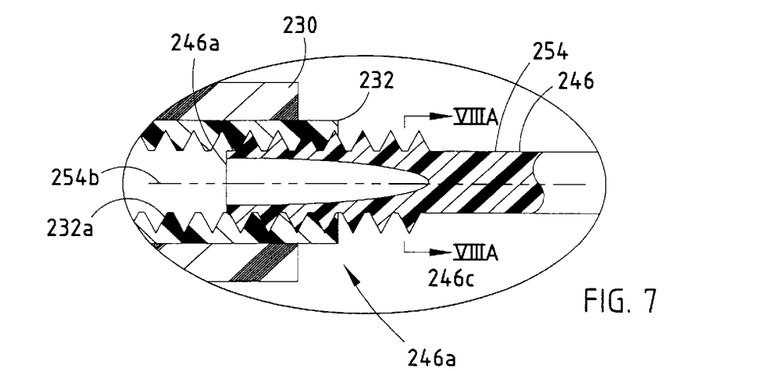
FIG. 7 is an enlarged view of the clutch mechanism of FIG. 6.

A third embodiment 210 of an extendable rearview mirror assembly is illustrated in FIGS. 6 and 7. Mirror assembly 210 is of similar construction to the first embodiment and includes a mounting bracket 214, a support 216, and a mirror subassembly 218, which is movably mounted on support 216. Mirror subassembly 218 includes a housing 220 and a drive assembly 236 which is supported in housing 220. Support 216 includes a pair of support arms 232 and 234 which extend into housing 220 through sleeves 230. Similar to the previous embodiment, driver 236 includes a motor 244, which is mounted in housing 220 by motor supports 244a and 244b, and a pair of drive screws 246 and 247. Drive screws 246 and 247 are rotatably mounted in housing 220 by bushing supports 246b and 247b, respectively. In the illustrated embodiment, drive screws 246 and 247 extend into and threadingly engage support arms 232 and 234 to move housing 220 along support arms 232 and 234, as will be more fully described below. In the illustrative embodiment, drive screw 246 includes longitudinally extending threads 248 between supports 246b which are drivingly engaged by a worm gear 250 of motor 244. In this manner, as motor 244 drives worm gear 250, drive screw 246 is rotated about its longitudinal axis. Drive screw's rotational movement imparts rotational movement to drive screw 247 by way of a belt 252, such as a timing belt. As noted above, drive screws 246 and 247 threadingly engage support arms 232 and 234 to move housing 220. In preferred form drive screws 246 and 247 each include a compressible end portion 246a and 247a respectively, which are threaded. End portions 246a and 247a respectively engage the inner surface of support arms 232 and 234, which are internally threaded. As will be more fully described below, compressible end portions 246a and 247a are sufficiently flexible to permit disengagement of end portions 246a and 247a from the internal threads 232a and 234a of support arms 232 and 234 when an obstacle is encountered or a sufficient manual force is applied to move mirror subassembly 220 in or out along support 216.

Figure 7A:
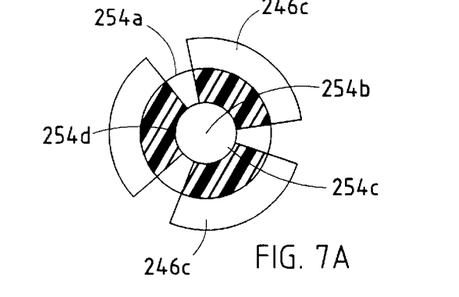
FIG. 7A is a cross-sectional view taken along line VIIA—VIIA of FIG. 7.

Referring to FIGS. 7 and 7A, shaft 254 of driver screw 246 includes a plurality of elonged slots 254a which extend along a longitudinal axis 254b of shaft 254. In addition, shaft 254 includes an elongate bore 254c which extends into distal end 246a of drive screw 246. Together, elongated slots 254a and elongate bore 254c define flexible arcuate portions 254d on which threads 246c are formed. In this manner, when a sufficient axial force is applied to drive screw 246, arcuate members 254d compress releasing threads 246c from engagement with threads 232a of support arm 232 to provide a manual override and to provide a safety release of drive assembly 236 from support 216. Drive screw 247 includes a similar arrangement to drive screw 246. In this manner, compressible end portions 246a and 247a couple drive, assembly 236 to support 216 and, further, provide a clutch mechanism for drive assembly 236.

Figure 8:
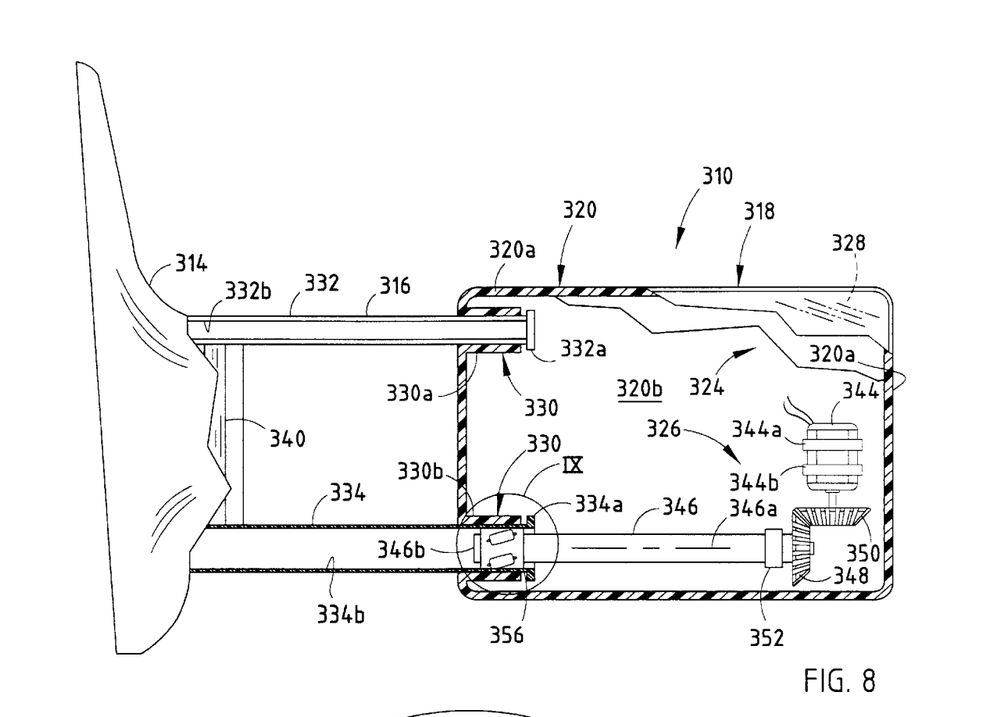
FIG. 8 is a partial fragmentary view of a fourth embodiment of the extendable rearview mirror assembly of the present invention.

Referring to FIG. 8, a fourth embodiment 310 of an extendable exterior rearview mirror assembly of the present invention is illustrated. Mirror assembly 310 includes a bracket 314 of similar construction to bracket 14, a support 316, and a mirror subassembly 318 which is movably mounted on support 316. Mirror subassembly 318 includes a housing 320 which defines a rearward facing opening 328 in which reflective assembly 324 is positioned. Housing 320 is defined by a housing wall 320a and includes upper and lower sleeves 330a and 330b which extend into housing cavity 320b and provide a mounting surface for housing 320 on support 316, as will be more fully described below.

In the illustrated embodiment, support 316 includes a pair of spaced apart support arms 332 and 334 which are pivotally mounted to mounting bracket 314 on a pivot bushing 340. Support arm 332 extends into upper sleeve 330a of housing 320 and includes an enlarged end, for example a flange, which defines a stop 332a. Support arm 334 extends into lower sleeve 330b of housing 320 and similarly includes an enlarged end 334a to define a stop. In this manner, housing 320 is movable between an inboard position, with housing 320 in close proximity or abutting mounting bracket 314 and one or more extended positions, with an outermost extended position being defined where stops 332a and 334a abut sleeves 330a and 330b.

Housed in mirror subassembly 318 is a drive assembly 326. Drive assembly 326 includes a motor 344, which is supported or mounted to casing wall 320a by motor supports 344a and 344b, and a drive rod or tube 346. Drive rod 346 is mounted to housing 320 by one or more bushing supports 352 and includes a driven gear 348 which is driven by a motor drive gear 350. In the illustrated embodiment, driven gear 348 and drive gear 350 are beveled gears; however, it should be understood by those skilled in the art that other gear arrangements, for example worm gear arrangements may be used to rotate drive rod 346 about its longitudinal axis 346a. Mounted to end portion 346b of drive rod 346 is a frictional roller assembly 356. As will be described in further detail below, frictional roller assembly 356 frictionally engages the inner surface 334b of support arm 334 to move or translate housing 320 along support arms 332 and 334.

Figure 9:
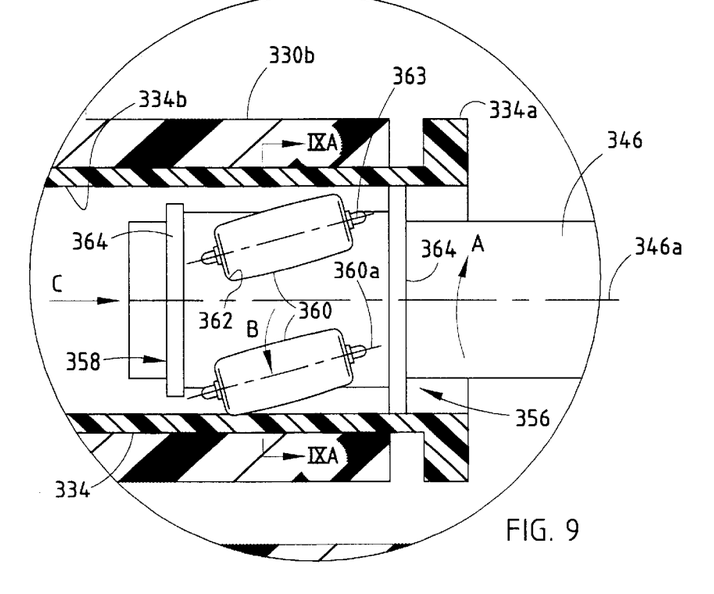
FIG. 9 is an enlarged view of a section of the drive assembly of FIG. 8.
Figure 9A:
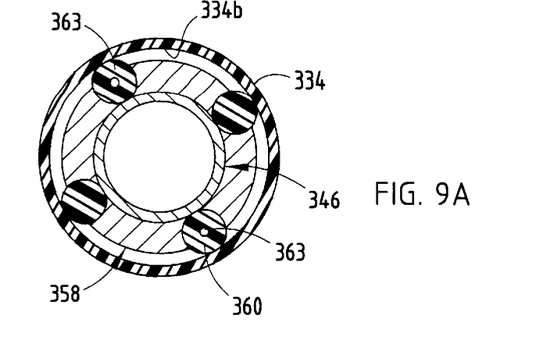
FIG. 9A is a cross-section view taken along line IXA—IXA of FIG. 9.

Referring to FIG. 9, roller assembly 356 includes a mounting collar 358 which is mounted on drive rod 346 and supports a plurality of rollers 360. Rollers 360 are rotatably mounted to collar 358 in openings 362 provided in collar 358 which permit rollers 360 to frictionally engage drive rod 346. Collar 358 is secured to drive rod 346 by mounting plates or members 364. Collar 358 is sized such that rollers 360 also frictionally engage inner surface 334b of support arm 334. In addition, rollers 360 are aligned along roller axes 363 which are skewed with respect to longitudinal axis 346a of drive rod 346. In this manner, when drive rod 346 is driven by motor 344 to rotate about its longitudinal axis 346a indicated by Arrow A in FIG. 9, rollers 360 roll about their respective longitudinal axes 363 in a counter-direction, as indicated by Arrow B in FIG. 9. Consequently, rollers 360 impart axial motion to drive rod 346 as drive rod 346 rotates in response to the friction between rollers 360 and inner surface 334b. As a result, drive rod 346 moves in and out of support arm 334. As drive rod 346 moves in or out of support arm 334, housing 320 is translated or moved along support arms 332 and 334. It should be understood from the foregoing, by altering the angle of roller axis 363, the speed of the axial movement of rod 346 through support arm 334 can be adjusted. For example, with a lower angle the speed is reduced as the more rotations of rod 346 are needed to provide a given axial adjustment.

It should be understood that rollers 360 may comprise wheels or the like. Preferably, rollers 360 comprise a relatively high friction material, for example rubber or the like. Further, drive rod 346 may include a plurality of threads similar to drive rod 246, with motor 344 including a worm gear similar to motor 244. Moreover, similar to mirror assembly 210, mirror assembly 310 may include a second drive rod for extending into and frictionally engaging the inner surface 332a of support arm 332.

Figure 10:
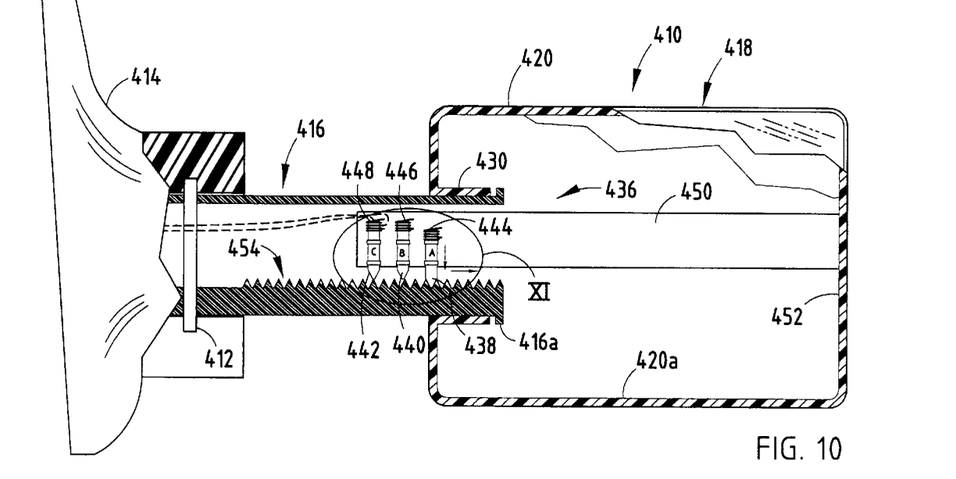
FIG. 10 is a partial fragmentary view of a fifth embodiment of an extendable exterior rearview mirror assembly of the present invention.
Figure 11A:
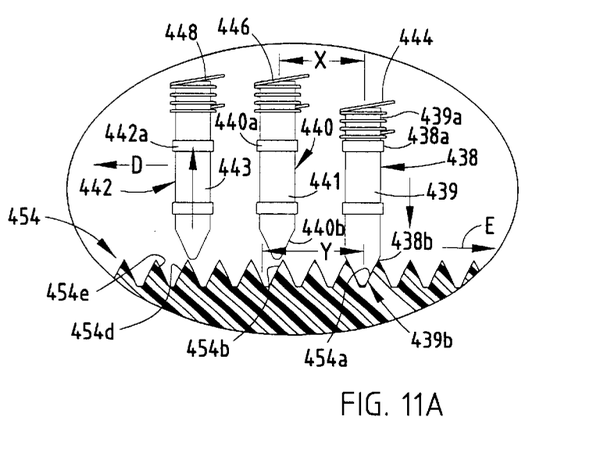
FIGS. 11A through 11C are enlarged views of the drive assembly of FIG. 10 illustrating a sequence for actuating the drive pistons of the drive assembly.
Figure 11B:
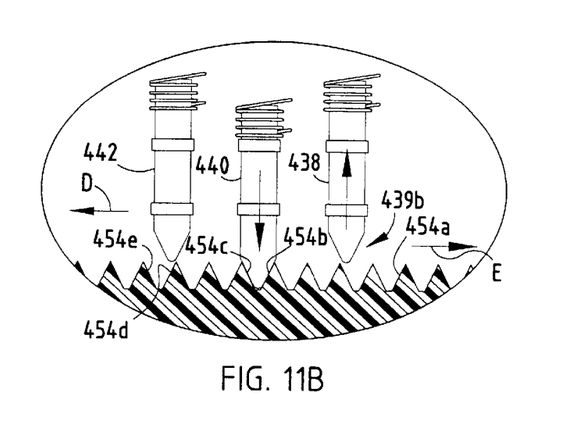
Figure 11C:
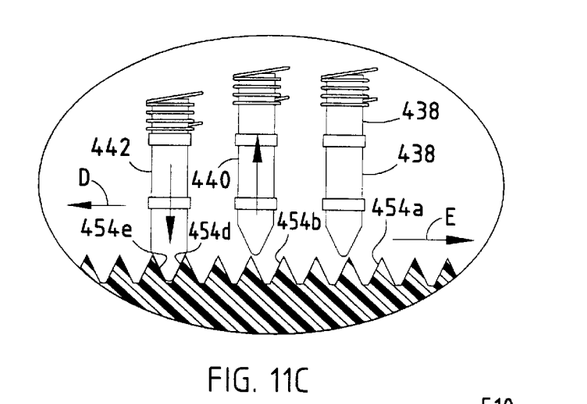

Referring to FIG. 10, a fifth embodiment of mirror assembly 410 is illustrated. Mirror assembly 410 includes a mounting bracket 414, a support 416, and a mirror subassembly 418 which is slidably mounted on support 416. In similar manner to the previous embodiments, 416 is pivotally mounted to bracket 414 by a pivot bushing 412 and extends into housing 420 of mirror subassembly 418 through a sleeve 430 to thereby permit housing 420 to move between a fully retracted position and one or more outboard positions along support 416. The outermost extended position is defined when sleeve 430 abuts stop 416a of support 416. Mounted in mirror subassembly 418 is a drive assembly 436, which includes a plurality of solenoid driven pistons 438, 440 and 442. Each piston 438, 440 and 442 has an elongated body 439, 441, and 443, respectively, which is driven by a coil 444, 446, or 448, respectively. Each tooth piston 438, 440 and 442 is laterally mounted to support 450 by a support 438a, 440a, or 442a, respectively. Elongated bodies 439, 441, and 443 extend into piston supports 438a, 440a, and 442a, which are mounted to housing 420 by support 450 and include tapered distal ends 439a. In this manner, tooth pistons 438, 440 and 442 are guided by and free to move through supports 438a, 440a and 442a. In the illustrated embodiment, support 450 comprises a transversely extending arm which is secured to or formed with side wall 452 of housing 420. However, it should be understood that support 450 can be mounted to housing 420 in a plurality of positions on housing wall 420a. As best seen in FIGS. 11A through 11C when actuated, tooth pistons 438, 440 and 442 extend toward a tooth rack 454, which is mounted to or formed with arm 416. As will be more fully described below, tooth pistons 438, 440 and 442 are sequentially actuated to cause housing 420 to translate along support 416 between a fully retracted position to one or more extended positions.

As previously noted, tooth pistons 438, 440, and 442 are each individually actuated and moved by solenoid coils 444, 446 and 448 such that their respective tapered ends 439a extend into and engage tooth rack 454. In order to translate housing member 420 toward bracket 414, tooth pistons 438, 440 and 442 are sequenced such that piston 438 is initially extended into engagement with one of the threads on tooth rack 454 as shown in FIG. 11A. As shown in FIG. 11A, the spacing "X" between pistons 438 and 440 is less than spacing "Y" between the corresponding threads of tooth rack such that when second piston 440 is actuated to extend into engagement with tooth rack 454, tapered surface 440b of piston 440 will engage tapered side 454b of an adjacent thread of tooth rack 454 and impart a lateral force to housing 420 such that housing 420 translates in the direction indicated by arrow D, which in turn causes piston 438 to withdraw from tooth rack 454, as shown in FIG. 11B (arrow E indicates relative motion of rack 454 with respect to the pistons). In a similar manner, following actuation of piston 440, piston 442 is actuated to extend into tooth rack 454 such that tapered side 442b engages and translates down tapered side 454d of another adjacent thread of tooth rack 454 causing piston 440 to disengage from tooth rack 454. The sequence is repeated until housing 420 is in its desired position along support 416. It should be understood from the foregoing, that drive assembly 436 may include two or four or more pistons, with the greater number of pistons providing a smoother drive function. In addition, pistons 438, 440 and 442 may be powered by electromagnets, or piezoelectric elements or the like. It should be understood from the foregoing, that in order to reverse the direction of movement of housing 420 along support 416, the sequencing of the piston actuation is reversed with piston 442 being first actuated, followed by piston 440, and then followed by piston 438.

Figure 12:
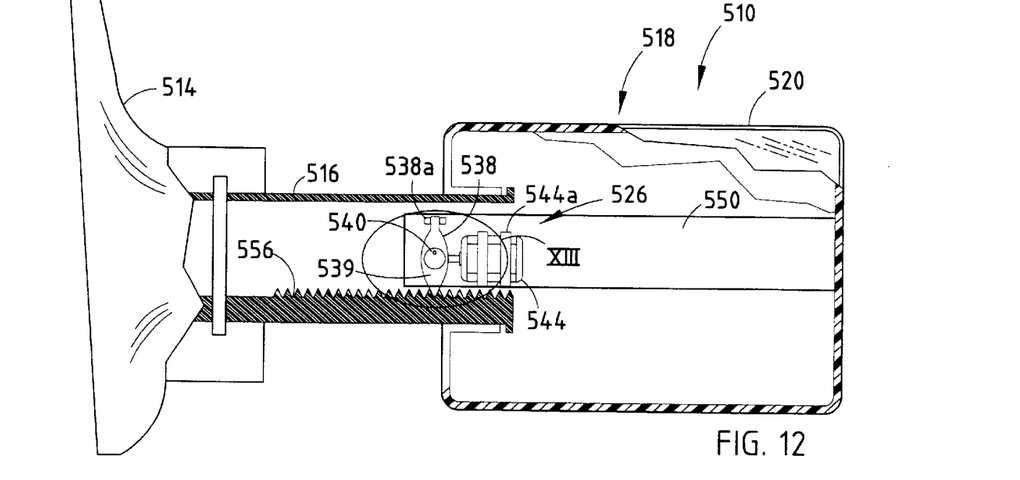
FIG. 12 is a partial fragmentary view of extendable rearview mirror assembly of FIG. 10 with another embodiment of the drive assembly of the present invention.
Figures 13A, 13B:
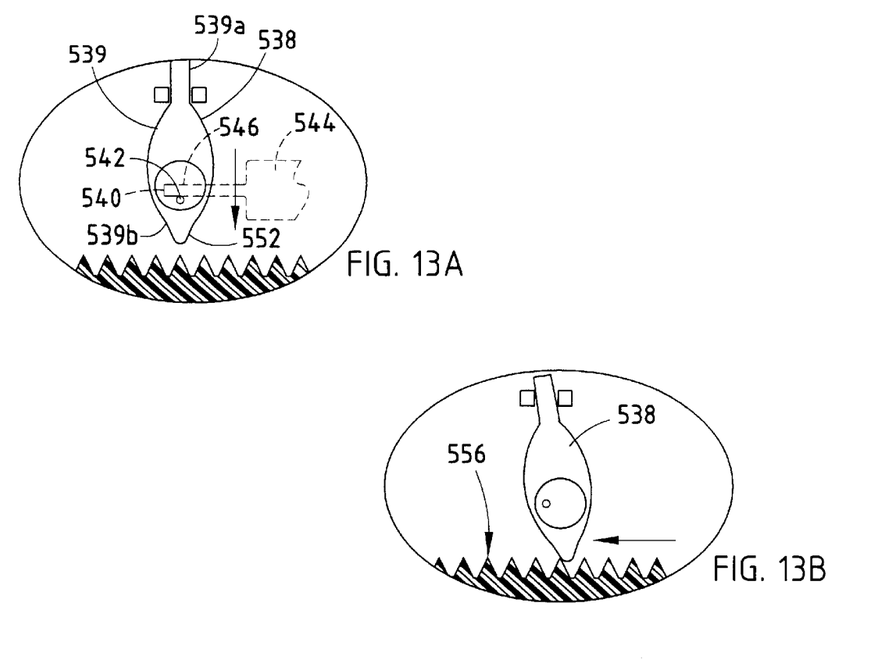
FIGS. 13A through 13D are enlarged views of the driver piston of the drive assembly of FIG. 12 illustrating the motion of the driver piston.
Figure 13C:
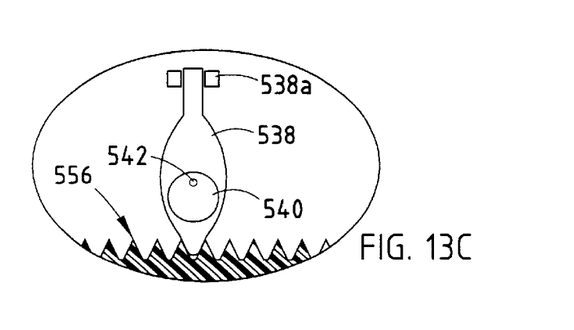
Figure 13D:
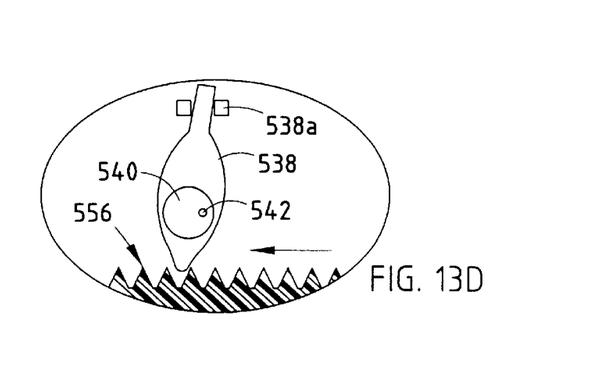

Referring to FIG. 12, a sixth embodiment 510 of an extendable exterior rearview mirror assembly is shown. Mirror assembly 510 is of similar construction to mirror assembly 410 and includes a mounting bracket 514, a support 516, which is pivotally mounted on bracket 514, and a mirror subassembly 518, which is movably mounted to support 516. Mirror subassembly 518 includes a housing 520 into which support 516 extends. In this embodiment, mirror subassembly 518 includes a drive assembly 526 which includes a single driver piston 538. Piston 538 is driven by motor 544, which induces a cycloidal motion in piston 538. Similar to the previous embodiment, driver piston 538 sequentially engages threads on tooth rack 556 of arm 516. Piston 538 and motor 544 are mounted to housing 520 on a support member 550 by motor supports 544a and piston supports 538a, respectively.

Referring to FIGS. 13A through 13D, piston 538 has a lozenge shaped body 539 with a reduced neck 539a on one end and a tapered thread engaging portion 539b on its other end. Mounted to a central portion of body 539 is a bushing 540 which includes an eccentrically mounted axle 542. Reduced neck 539a extends into and is laterally supported by piston supports 538a but is free to move axially through and rotate in support 538a. Axle 542 is driven by a worm gear 546 of motor 544. As axle 542 is rotated, for example in a clockwise direction as viewed in FIGS. 13A through 13D, bushing 540 moves piston 538 from a generally vertical orientation (shown in FIG. 13A) spaced from tooth rack 556 to an angled position in which tapered portion 539b of piston 538 engages a tapered side 556 a thread of tooth rack 556 (shown in FIG. 13B). As axle 542 continues to rotate in the clockwise direction, bushing 540 moves piston 538 to the left as viewed in FIG. 13C whereby tapered portion 539b is fully engaged between threads of tooth rack 556 and, further, piston 538 assumes a generally vertical position. Axle 542 continues to rotate in a clockwise direction causing tapered portion 539b to urge tooth rack 556 to the left relative to piston 538 as viewed in FIG. 13D. As a result, housing 520 moves away from mounting bracket 514 as viewed in FIG. 12. To move housing 520 to its retracted position, closer to mounting bracket 514, axle 542 is rotated in a counter-clockwise direction, which causes tooth rack 556 to move to the right as viewed in FIGS. 13A through 13D relative to piston 538. It should be understood from the foregoing, that more than one piston 538 may be used to drive housing 520 along support 516. With an increased number of pistons, it can be appreciated that the drive motion is smoother.

Figures 14, 14A:
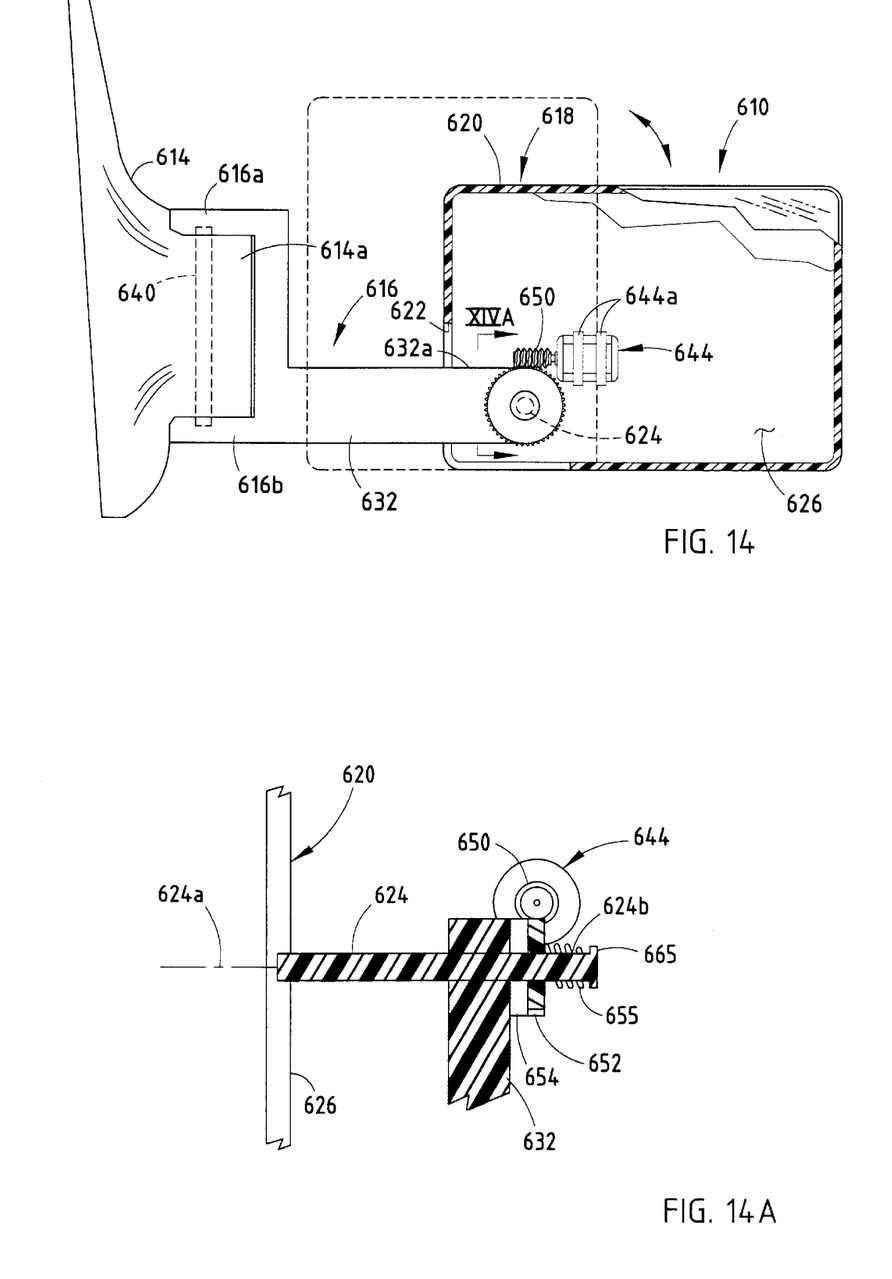
FIG. 14 is a partial fragmentary view of a seventh embodiment of the extendable rearview mirror assembly of the present invention.
FIG. 14A is a cross-section view taken along line XIVA—XIVA of FIG. 14.

A seventh embodiment of an exterior rearview mirror assembly 610 is illustrated in FIG. 14. Mirror assembly 610 includes a mounting bracket 614, a support 616, and a mirror subassembly 618 movably mounted to support 616. Support 616 includes a C-shaped mounting portion which includes a pair of spaced support arms 616a and 616b. Support arms 616a and 616b are pivotally mounted to a mounting portion 614A of mounting bracket 614 on a pivot bushing 640. Cantilevered from the C-shaped member of support 616 is a mounting arm 632 which extends into an opening 622 provided in mirror subassembly housing 620. Distal end 632a of mounting arm 632 includes a transversely extending axle 624 which extends into a bushing or the like (not shown) on rearward facing wall 626 of housing 620. Mounted on a projecting end 624b of axle 624 is a friction member 654 and a drive wheel or gear 652. Drive wheel 652 is rotatably mounted on free end 624b but is urged into frictional engagement with friction member by a spring 655, which is mounted between drive wheel 652 and an enlarged end portion 665 of axle 624. Spring 655 urges drive wheel 654 into frictional engagement with friction member 654 in order to drivingly couple motor 644 to arm 632. In this manner, when motor 644 is coupled to mounting arm 632 and actuated, housing 620 is rotated about axle 624. However, when housing 620 moves into engagement with a rigid structure or object or when a sufficient rotational force is applied to housing 622 about axle axis 624a to compress spring 655, motor 644 is drivingly decoupled from mounting arm 632 to permit manual adjustment of the position of housing 620 about axle 624. It should be understood, that friction member 654 may include a plurality of detents or the like for engaging a corresponding plurality of recesses or the like formed in drive wheel 652 in a similar manner to the previous embodiment shown in FIG. 5A.

In the illustrative embodiment, axle 624 is shown as an integral part of mounting arm 632; however, it should be understood that a separate axle may be mounted to free end of 632a. Furthermore, friction member 654 may be omitted with drive wheel or gear 652 frictionally engaging mounting arm 632 or may include detents to engage corresponding recesses formed in friction member 654 or mounting arm 632. These and other variations may be appreciated from the preceding description.

Figure 15:
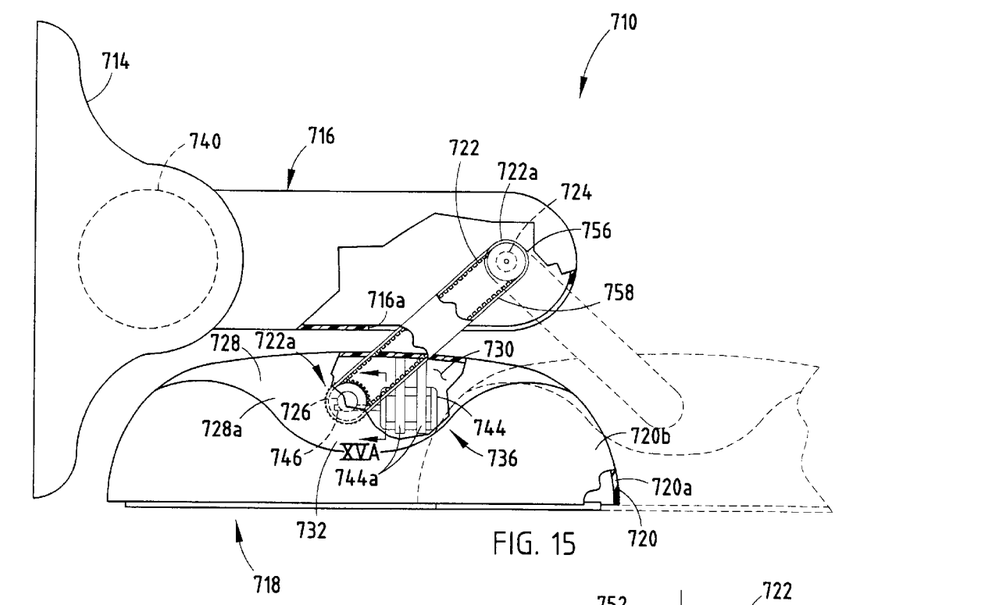
FIG. 15 is a plan view of an eighth embodiment of the extendable exterior rearview mirror assembly of the present invention.

Referring to FIG. 15, an eighth embodiment 710 of an extendable rearview mirror assembly of the present invention is illustrated. Similar to the previous embodiments, mirror assembly 710 includes a mounting bracket 714, a support 716, and a mirror subassembly 718 movably mounted to support 716 by such that mirror subassembly 718 can be moved between a fully retracted position (shown in solid lines in FIG. 15) and an extended position, with one such extended position illustrated in phantom lines in FIG. 15. Preferably, support 716 is pivotally mounted to mounting bracket 714 on a pivot bushing 740. Mirror subassembly 718 is pivotally mounted to support 716 by a link 722. Link 722 extends into support 716 and is rotatably mounted on one end 722a to support 716 by pivot pin or axle 724 or the like. Support 716 includes an opening 716a which is sized to accommodate the angular motion of link 722 between the mirror's fully retracted position and the mirror's fully extended position. Free end 722b of link 722 is similarly rotatably mounted to housing 720 on a pivot pin or axle 726. In the illustrated embodiment, pivot pin 726 extends through an upper wall 728 of housing 720 and into the interior 730 of housing 720 and is rotatably supported in upper wall 728 and bottom wall 732 of housing 720. It should be understood that pin 726 may be supported in the interior 730 by an intermediate structure.

As best seen in FIG. 15, mirror subassembly 718 is moved between its retracted position and extended positions by a drive assembly 736. Drive assembly 736 includes a motor 744 which is mounted to housing wall 720a of housing 220 by motor supports 744a. Motor 744 includes a drive gear 746, for example a worm gear, which drives a drive gear 750 mounted on axle 724. Mounted below link 722 on axle 726 is a driven wheel or sprocket 752 which is frictionally engaged by drive gear 750. Axle 724 similarly includes a driven sprocket or wheel 754 which is driven by driven wheel 752, as will be more fully described below. Extending around driven sprocket 752 and sprocket 754 is a closed loop belt 758, such as a timing belt. In order to drivingly couple drive gear 750 to driven gear 752, axle 726 includes a spring 760 which is positioned between drive gear 750 and a retaining ring 762 or the like which is mounted to axle 726. In this manner, when motor 744 is powered, worm gear 746 drives drive gear 750, which in turn is urged into frictional engagement with driven gear 752 by spring 760, which results in rotational movement of shaft 726 about its longitudinal axis 726a. Link 722 is rotatably supported on axle 724 such that when axle 726 rotates about its longitudinal axis 726a link 722 moves housing 720 from its retracted position to its fully extended position shown in phantom in FIG. 15.

In addition, in order to reduce the aerodynamic drag of mirror subassembly 716, upper wall 728 of housing 720 includes a recessed portion 728a which permits link 722 to be mounted flush with an upper surface 720b of housing 720 and yet permits the full range of motion of lever 722 between the mirror's fully retracted position to its fully extended position.

Figures 15A, 16:
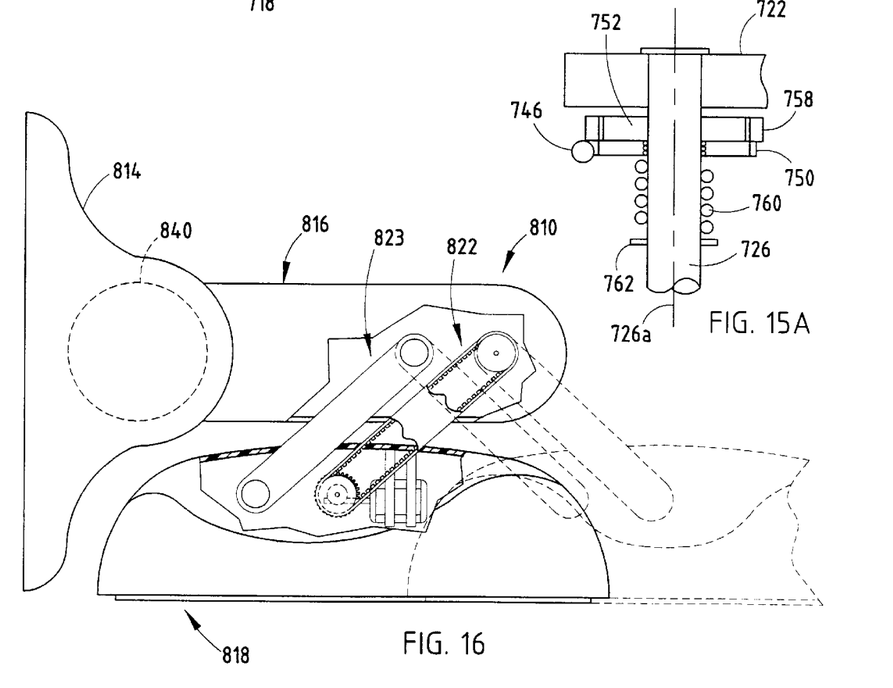
FIG. 15A is a cross-section view taken along line XVA—XVA of FIG. 15.
FIG. 16 a partial fragmentary view of a ninth embodiment of the extendable exterior rearview mirror assembly of the present invention.

Referring to FIG. 16, a ninth embodiment of the extendable rearview mirror assembly 810 of the present invention is illustrated. Mirror assembly 810 includes a mounting bracket 814, a support 816, and a mirror subassembly 818 which is pivotally mounted to and supported by support 816. Similar to the previous embodiment, support 816 is pivotally mounted to mounting bracket 814 on a pivot bushing 840 and includes a pair of links 822 and 823 for selectively pivotally mounting mirror subassembly 818 to support 816. Mirror assembly 818 is of similar construction to mirror assembly 710, with the addition of a second link member 823 which provides additional vertical support for mirror subassembly 818 on support 816. Link member 822 includes a similar drive mechanism to link 722 and selectively moves mirror subassembly 816 between a fully retracted position and one or more extended positions as shown in FIG. 16. It should be understood that second link member 823 may also include a similar drive mechanism to 822.

Furthermore, while one form of the invention has been shown and described, other forms will now be apparent to those skilled in the art. For example, the various embodiments illustrate electrically actuated drive assemblies, but it should be appreciated that other actuation systems may be used, such as a pneumatic system. In addition, as noted in reference to the first embodiment, the support may be fixed to the mounting bracket or have a breakaway mounting or a folding mounting or, further, may be directly mounted to the vehicle. The embodiment of the invention shown in the drawings is not intended to limit the scope of the invention which is defined by the claims which follow.

The embodiments of the invention in which we claim exclusive property or privilege is claimed are defined as:

1. An electrically extendable exterior rearview mirror assembly comprising:
   a mirror subassembly having a housing and a reflective element supported in said housing;
   a bracket adapted for mounting to a vehicle;
   a support mounting said mirror subassembly to said bracket, said support extending into said housing, said mirror subassembly being movable along said support and having a retracted position and at least one outboard position for said mirror subassembly and defining a direction of extension; and
   a drive assembly supported in said housing and drivingly coupled to said support, said drive assembly including a drive screw and a motor driving said drive screw, said drive screw extending into said support and drivingly engaging an inner surface of said support, said inner surface includes a plurality of threads, said drive screw engaging said threads to thereby move said housing along said support, said drive assembly selectively moving said mirror subassembly along said support, said drive screw including a compressible end portion having a plurality of drive screw threads for engaging said threads of said support, and said compressible portion compressing and disengaging said from said threads of said support when a force is applied to said housing in said direction of extension defining a clutch mechanism.

2. The electrically extendable exterior rearview mirror assembly according to claim 1, wherein said motor incldues a drive gear for drivingly engaging said drive screw.

3. The electrically extendable exterior rearview mirror assembly according to claim 2, wherein said drive gear comprises a worm gear.

4. The electrically extendable exterior rearview mirror assembly according to claim 1, wherein said drive screw comprises a first drive screw, said support comprising first and second support arms, said first drive screw extending into and drivingly engaging said first support arm, said drive assembly further comprising a second drive screw, and said second drive screw extending into and drivingly engaging said second support arm.

5. The electrically extendable exterior rearview mirror assembly according to claim 4, wherein said drive screws are interconnected.

6. The electrically extendable exterior rearview mirror assembly according to claim 5, wherein said motor includes a drive gear for drivingly engaging at least one of said drive screws.

7. The electrically extendable exterior rearview mirror assembly according to claim 6, wherein said drive gear comprises a worm gear.

8. An electrically extendable exterior rearview mirror assembly comprising:

a mirror subassembly having a housing and a reflective element supported in said housing;

a bracket adapted for mounting to a vehicle;

a support mounting said mirror subassembly to said bracket, said support extending into said housing, said mirror subassembly being movable along said support and having a retracted position and at least one outboard position for said mirror subassembly and defining a direction of extension; and a drive assembly supported in said housing and drivingly coupled to said support, said drive assembly including a drive screw and a motor driving said drive screw, said drive screw extending into said support and drivingly engaging an inner surface of said support, said inner surface includes a plurality of threads, said drive screw engaging said threads to thereby move said housing along said support, said drive screw comprising a first drive screw, said support comprising first and second support arms, said first drive screw extending into and drivingly engaging said first support arm, said drive assembly further comprising a second drive screw, said second drive screw extending into and drivingly engaging said second support arm, and said drive assembly selectively moving said mirror subassembly along said support.

9. The electrically extendable exterior rearview mirror assembly according to claim 8, wherein said first drive screw and said second drive screw are drivingly coupled together.

10. The electrically extendable exterior rearview mirror assembly according to claim 9, wherein said first drive screw and said second drive screw are drivingly coupled by a timing belt.

11. The electrically extendable exterior rearview mirror assembly according to claim 8, wherein said motor includes a drive gear for drivingly engaging at least one of said drive screws.

12. The electrically extendable exterior rearview mirror assembly according to claim 11, wherein said drive gear comprises a worm gear.

13. An electrically extendable exterior rearview mirror assembly comprising:

a mirror subassembly having a housing and a reflective element supported in said housing;

a bracket adapted for mounting to a vehicle;

a support mounting said mirror subassembly to said bracket, said support extending into said housing, said mirror subassembly being movable along said support and having a retracted position and at least one outboard position for said mirror subassembly and defining a direction of extension; and a drive assembly supported in said housing and drivingly coupled to said support, said drive assembly selectively moving said mirror subassembly along said support, said drive assembly permitting disengagement from said support when an external force having a sufficient magnitude is applied to said housing along said direction of extension such that said mirror subassembly can be manually moved along said support, said support comprising a pair of support arms, said support arms extending into said housing of said mirror assembly, said drive assembly including a pair of drive members, and each of said drive members extending into a respective support arm of said support arms.

14. The electrically extendable exterior rearview mirror assembly according to claim 13, wherein said drive members are interconnected.

15. The electrically extendable exterior rearview mirror assembly according to claim 14, wherein said drive members are interconnected by a drive belt.

16. The electrically extendable exterior rearview mirror assembly according to claim 13, wherein each of said drive members comprises a drive screw.

17. The electrically extendable exterior rearview mirror assembly according to claim 13, wherein each of said support arms comprises a tubular member, said drive members engaging an inner surface of said tubular members to thereby move said mirror subassembly along said support.

* * * * *

UNITED STATES PATENT AND TRADEMARK OFFICE
CERTIFICATE OF CORRECTION

PATENT NO. : 6,325,518 B1  
APPLICATION NO. : 09/267532  
DATED : December 4, 2001  
INVENTOR(S) : Peter John Whitehead and Michiel Pieter van de Ven It is certified that error appears in the above-identified patent and that said Letters Patent is hereby corrected as shown below:

Column 5:  
Line 28, Insert --a-- after "comprise".  
Line 47, Insert --now U.S. Pat. No. 5,668,663,-- after "et. al.".  
Line 63, Insert --now U.S. Pat. No. 5,569,423,-- after "et. al.".

Column 6:  
Line 7, Insert --, now U.S. Pat. no. 6,019,475-- after "et. al.".

Column 7:  
Line 17, "24" should be --36--.  
Line 21, "24" should be --36--.

Column 10:  
Line 38, Insert --support-- before "416".  
Line 64, "arm" should be --support--.

Column 11:  
Line 65, "556" should be --556a of--.

Column 14:  
Line 31, Claim 1, "includes" should be --including--.  
Line 38, Claim 1, Insert --end-- before "portion".

Column 15:  
Line 15, Claim 8, "includes" should be --including--.

Signed and Sealed this

Thirtieth Day of January, 2007

JON W. DUDAS  
*Director of the United States Patent and Trademark Office*